United States Patent [19]
Schmidt, Jr. et al.

[11] 3,778,865
[45] Dec. 18, 1973

[54] ATTACHMENT FOR A UTILITY VEHICLE OR FOR A TRAILER OF SUCH VEHICLE

[76] Inventors: Alfred Schmidt, Jr., Friedrichstrasse 17; Guenter Pastari, Im Frongarten 20, both of St. Blasien, Germany

[22] Filed: Feb. 18, 1972

[21] Appl. No.: 227,517

Related U.S. Application Data

[63] Continuation-in-part of Ser. No. 88,000, Nov. 9, 1970, abandoned.

[30] Foreign Application Priority Data
June 20, 1970 Germany.................. P 20 30 579.7

[52] U.S. Cl..................................... 15/340, 15/359
[51] Int. Cl.......................................... A47l 9/00
[58] Field of Search....................... 15/340, 354, 359

[56] References Cited
UNITED STATES PATENTS

| | | | |
|---|---|---|---|
| 2,458,258 | 1/1969 | Furr..................................... | 15/340 |
| 705,585 | 7/1902 | Hope .................................. | 15/354 X |
| 948,164 | 2/1910 | Dougherty......................... | 15/354 X |
| 2,361,909 | 11/1944 | Bernal................................ | 15/340 X |
| 2,699,637 | 1/1955 | Nisbet................................ | 15/359 X |
| 3,460,186 | 8/1969 | Sherrill et al. .................... | 15/340 |
| 3,676,891 | 7/1972 | Murray et al. .................... | 15/340 X |

Primary Examiner—Harvey C. Hornsby
Assistant Examiner—C. K. Moore
Attorney—Wolfgang G. Fasse

[57] ABSTRACT

The invention relates to an attachment for a utility vehicle or trailer pulled by the utility vehicle. The attachment picks up items such as mowed grass or dirt, on or adjacent to a road for loading into the vehicle. A suction fan with inlet and outlet conduits forms part of the attachment. The inlet or suction conduit has a horizontal leg and a trailing leg. A suction nozzle is secured to the free end of the trailing leg. Rotating means are provided between a fan housing and said horizontal leg and/or between said nozzle and said trailing leg for rotating the suction conduit about a horizontal axis and/or the nozzle about the sloping axis of said trailing leg, whereby the nozzle is maintained in a trailing position and enabled to follow automatically the shape of the ground.

26 Claims, 8 Drawing Figures

ATTACHMENT FOR A UTILITY VEHICLE OR FOR A TRAILER OF SUCH VEHICLE

CROSS REFERENCE TO RELATED APPLICATION

The present application is a continuation-in-part application of copending U.S. Pat. application Ser. No. 88,000 filed Nov. 9, 1970 by the present applicants which is now abandoned.

BACKGROUND OF THE INVENTION

The present invention relates to an attachment for a utility vehicle, which attachment may be coupled to the vehicle itself or to a trailer pulled by the vehicle. The attachment is intended for removing items such as cut grass, leaves, dirt or the like from the road and from shoulders adjacent to the road as well as from any median strip to load such items onto the vehicle or trailer.

Although most operations in connection with road maintenance and street cleaning are being done mechanically, so far no practical apparatus has been known for removing cut grass and the like from roadside shoulders and median strips. Accordingly, usually cut grass or accumulated leaves have been removed by hand by road maintenance crews. Hitherto, this manual work has been considered to be unavoidable, especially where the grass shoulders are narrow and especially where such shoulders are interrupted by guide barriers or similar road markings.

On roads with very wide grass shoulders or median strips it is possible to employ so called field choppers, such as are used in agriculture. These devices are constructed for mounting on the side of a tractor and with wheels for support on the ground. Therefore, these agricultural devices are not particularly suitable for use on narrow shoulders, especially if the shoulders have a slope, or gullies or other obstructions or are separated from the road proper by guide means. A further drawback of these known devices is seen in that they constitute a traffic obstruction when they move along the road because the known devices extend laterally away from the tractor.

Another known apparatus comprises a mowing device adapted for mounting to the front end of a vehicle. Following to the mower there is secured to the vehicle a fan for blowing the cut grass away from the road and from the shoulders, so that it falls to the ground at a substantial distance away from the edge of the road. The grass which is thus removed from the road is then usually raked together by hand rakes or by mechanical rakes and is then transported away. This known apparatus is indeed useful for removing the cut grass from the road; however, it does not solve the problem of transporting the cut grass away.

Another known attachment for mowing and removing grass from road sides is described in U.S. Pat. No. 840,794. This known attachment is constructed for mounting on the rear end of a tractor and comprises a frame connected to the tractor by means of a parallelogram linkage for raising and lowering and it projects laterally beyond the tractor. A mowing cutter is provided on the projecting portion and directly adjacent to the mowing cutter there is an intake opening of a suction conduit connected to a suction fan. The fan delivers the sucked-in grass through a delivery conduit to a loading space on a trailer. This known device has the same drawbacks as mentioned above in connection with agricultural devices. Since the mower and the ground suction means are rigidly connected with the frame which is supported on wheels, the device cannot be used or may be used rather inefficiently on uneven ground or sloping shoulders. Besides it is difficult for the driver to keep an eye on the position of the projecting device relative to any obstructions and to steer the tractor so as to avoid such obstructions.

U.S. Pat. No. 3,460,186 discloses a vacuum type street cleaner, having a suction conduit which is maintained in a vertical operating position. Such operating position necessitates telescoping means for automatically varying the effective length of the vertical suction conduit when the suction nozzle encounters an obstacle on the street surface. Small obstacles may be cleared by pivoting the normally vertical suction conduit out of its vertical operating position. However, this brings the nozzle into a substantially ineffective position since the nozzle cannot adapt itself to the shape of the ground nor to the tilted position of the suction conduit until the latter is back in its vertical operating position. Thus, this device is not suitable for cleaning a sloping surface.

OBJECTS OF THE INVENTION

In view of the foregoing the invention aims at achieving the following objects singly or in combination:

to overcome the outlined drawbacks of prior art devices; more specifically, to position a suction nozzle in such a manner relative to the ground that during operation the nozzle intake opening always takes up the optimum suction distance from the ground regardless whether the attachment is carried by the vehicle itself or by a trailer pulled by the vehicle;

to assure constantly high efficient pick-up or suction regardless of the shape or slope or unevenness of the ground, whereby the nozzle shall adjust its instantaneous position automatically in response to the shape of the ground in a vertical direction and/or in a lateral direction;

to guide the suction nozzle along the ground, preferably at a predetermined distance above the ground, in response to the shape of the ground, whereby the nozzle continuously adapts its position to such shape of the ground;

to provide a suction means which is rotatably adjustable about at least one axis, preferably about three different axes, automatically and in response to the shape of the ground, whereby any instantaneous position of the nozzle depends on the shape of the ground at that position and not from the position of the vehicle;

to improve the efficiency of operation, especially in connection with road maintenance and cleaning whereby, if desired, the nozzle end of the suction conduit may be guided by an operator;

to provide a trailing position for the suction nozzle regardless whether the attachment is secured to the front or rear end of a vehicle or to a trailer pulled by said vehicle whereby the suction conduit will be maintained in a trailing operating position slanting relative to the direction of vehicle advance;

to provide the suction conduit with a horizontal portion of sufficient length to keep the slanting conduit portion out of interference with the vehicle proper;

to mount the attachment in such a manner that the forces exerted on the attachment by the travel of the vehicle are substantially smaller than heretofore;

to mount the suction means in such a position that road limiting guide markers or the like having an ordinary height may be passed over;

to employ ball bearings for rotatably connecting the suction means or sections thereof so as to rotate these sections on their respective longitudinal axes;

to make at least one suction conduit section longitudinally extendible;

to support the attachment for horizontal and preferably also for vertical adjustment;

to combine the suction means with a mower; and to locate a delivery conduit in a position so as to adjust it about a vertical axis.

SUMMARY OF THE INVENTION

According to the invention there is provided an attachment for a utility vehicle having a suction conduit with one end connected to a suction fan and having secured to the other end thereof guided suction nozzle means supported on the ground with a suction opening directed toward the ground, and arranged to be movable or adjustable automatically in response to the shape of the ground about a horizontal axis for providing a trailing and tilting movement resulting in a vertical nozzle adjustment and/or about a tilted axis resulting in a rotating lateral nozzle adjustment on a sloping ground surface. The attachment may be coupled to the vehicle itself, for example, to the front or rear end thereof, or to a trailer which is pulled by the vehicle.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
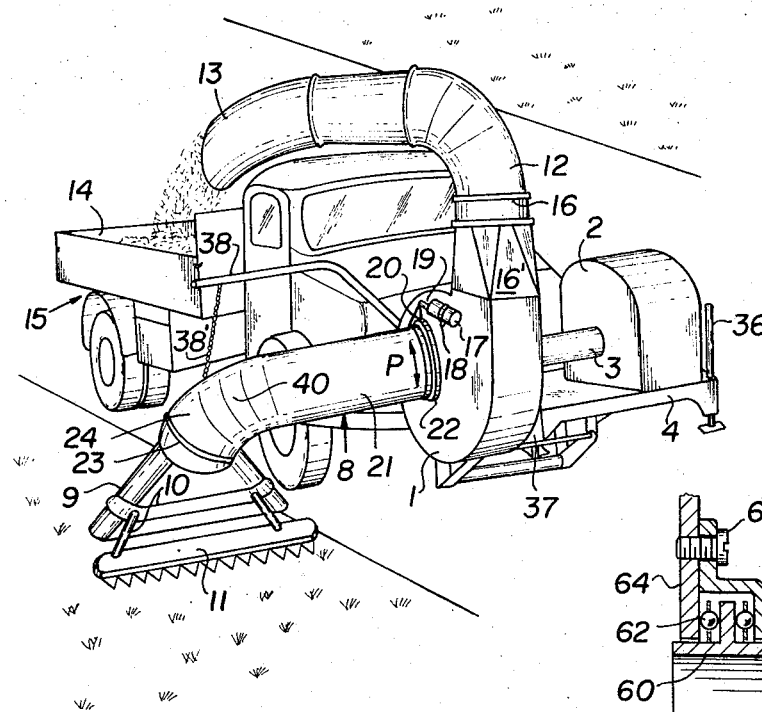
FIG. 1 is a perspective side-front view of the present attachment secured to a truck.

The attachment assembly shown in FIG. 1, comprises a suction fan 1 which is driven by means of an engine 2 through the shaft 3. Fan and engine are secured on a common frame or support structure 4. A suction conduit 8 is connected to the inlet of the fan 1 and carries on its other end a suction nozzle 9. The nozzle 9 and the conduit 8 will be referred to as the suction means.

A mower means 11 is secured through the retaining means 10 to the suction nozzle and, in the interests of simplicity of the drawing, the mower drive is not shown.

A delivery conduit 12 is connected to the outlet 16' of the fan 1 and has an endpiece 13 above the loading space 14 of the vehicle 15. The delivery conduit 12 is rotatably connected, for example in a slide bearing 16, to the outlet 16' of the fan 1. The rotatable mounting of the delivery conduit 12 which permits moving the conduit 12 about a vertical axis has the advantage that the delivery conduit 12 easily reaches all parts of the loading space 14 and may also be swung over to a trailer or other vehicle.

A hydraulic piston cylinder means 17 is pivotally mounted, for example, to the wall of the housing of the fan 1 to journal about a stud 18. Its piston rod 19 is connected through member 20 to the horizontal portion 21 of the conduit 8 which is connected by rotation permitting means, such as a ball bearing ring mount 22 to the inlet of fan 1. By operating the hydraulic piston cylinder means 17, the suction conduit 8 is turned, preferably as a unit, as indicated by the arrow P about its horizontal axis, whereby the lower section 24 of the conduit 8 may be lifted, for example, for short distance transportation. When the means 17 is not operated, the conduit 8 may freely rotate about the ring mount 22.

Further rotatable means 23 which may be similar to the ring mount 22 are provided between the downwardly sloping lower section 24 and the suction nozzle 9, whereby free rotation (arrow F, FIG. 2.) about the longitudinal axis of section 24 is possible. Section 24 extends oppositely to the direction E of vehicle travel and downwardly so that section 24 is inclined rearwardly, whereby in combination with the free rotation about means 22 and 23 the nozzle 9 is free to move up and down substantially vertically as well as at an angle to the horizontal in response to the shape of the ground surface 26, whereby its position matches any unevenness of said surface, and accordingly a very efficient pick-up or vacuum removal is achieved.

The further rotatable means 23 permits using the present apparatus even on roadside shoulders having a substantial inclination or slope to the horizontal, whereby the suction nozzle is movable automatically in adaptation to the profile of the ground to assume positions in which the plane defined by the suction opening 39 is inclined to the horizontal.

Figure 4:
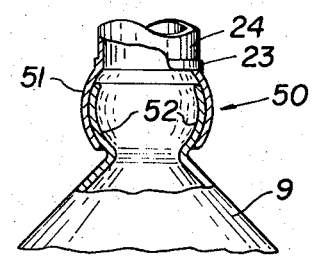
FIG. 4 is a partial view of the connection of the suction nozzle to the end of the suction conduit.

A third possibility of moving or rotating the nozzle 9 is shown in the form of a snap link 50 arranged between the rotatable means 23 and the nozzle 9 as shown in FIG. 4. The snap link 50 comprises resilient fingers 51 and the nozzle 9 a shaped head 52 which lightly and removably fits between the fingers 51 for easy rotational and/or pivotal movement, whereby the suction nozzle 9 is capable of automatically pivoting about an axis extending perpendicularly to the plane defined by the suction opening 39 to even better follow the ground profile and relative to obstructions. Thus, the suction nozzle 9 can move out of the way of an obstruction by pivoting about a point in contact with the obstruction.

Figure 2:
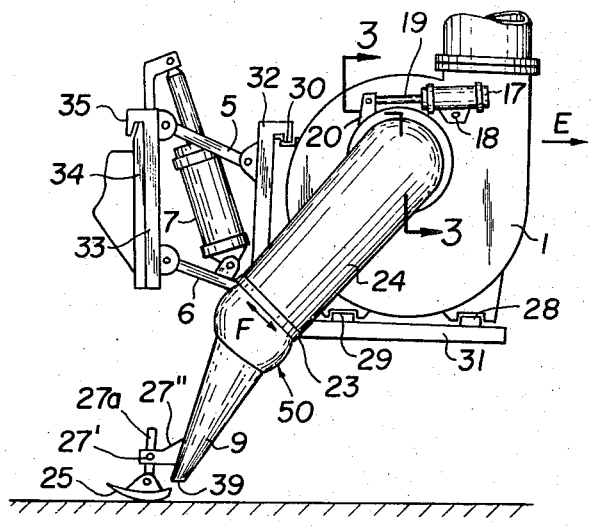
FIG. 2 illustrates a side elevational view of an embodiment comprising modifications as compared to FIG. 1.

In FIG. 2 the suction nozzle 9 is shown in a typical trailing position relative to the forward vehicle movement indicated by the arrow E. The downwardly directed section 24 of the suction conduit 8 takes up an inclined position, the sloping angle of which is determined by the profile of the ground surface of the road shoulder. For this purpose, the suction nozzle 9 is preferably supported with respect to the ground 26 by guide means such as two skids 25 or wheels. Each skid 25 is adjustably secured in a retaining device 27'' which is securely connected to the suction nozzle 9. A rod 27a extends through the retaining device 27'' and may be fixed in an adjusted position by means of a set screw 27'.

Mounting the present attachment to the front end of the vehicle is particularly advantageous, especially, when the suction conduit 8 is sufficiently rigid to be self-supporting and extends between the suction inlet connection of the fan 1 and the shoulder to be cleared. Thus, a first section 21 extends substantially perpendicularly to the direction E of travel and horizontally above the ground. A further section 24 which is joined to the first section 21 by an elbow section 40 is directed downwardly and opposite to the direction E of travel of the vehicle in such a manner that the suction nozzle 9 is guided in a trailing position relative to the vehicle. According to this embodiment the portion of the attachment which extends laterally outside the width of the vehicle comprises merely the suction conduit 8 which is connected to the fan 1 in such a way that the suction nozzle 9 secured to its free end will slide on the ground as it is drawn or trailed by the vehicle 15. In this manner the least possible forces are transmitted both to the suction conduit 8 and also to the remaining components of the entire apparatus. This is an advantage of the invention.

In order to allow movement past guiding means such as barriers, direction signs, bollards, or similar obsturctions or marking devices present alongside of the road, the horizontal section 21 of the suction conduit 8 is arranged at such a height above the ground that it can pass over these means.

FIG. 2 shows a slightly modified embodiment. The suction fan 1 and the engine 2 are mounted on guides 28, 29, 30 to be horizontally displacable in a support structure 31, 32. The horizontal movement of the fan 1 and engine can be effected by a hydraulic or pneumatic piston cylinder arrangement (not shown). The support structure 31, 32 is connected to plate 34 mounted on the vehicle 15 through the carrier device 33 comprising said supporting arms 5 and 6. The angular position of the supporting arms can be adjusted by means of the hydraulic or pneumatic piston cylinder arrangement 7, so that the fan/engine is adjustable in height even when the vehicle is under way.

The piston cylinder arrangement 7 also has a very important function during the mounting of the attachment on the vehicle. For this purpose the piston cylinder 7 is connected through pipes to a source of pressure on the vehicle. By extension of the piston rod the carrier device 33 is lifted so that when a predetermined height is reached the carrying plate 34 on the vehicle 15 is positioned underneath the noses 35 of the carrier device 33. By subsequently lowering the carrier device 33 by reducing the length of the piston rod, the plate 34 engages under the noses 35. An automatic centering may be achieved by providing conical recesses in the plate 34 on the vehicle and by shaping the noses 35 conically.

After the carrier 33 and the plate 34 have been secured in their engaged position by screws or any other connecting means so that they are held in engagement, the attachment can be lifted from the ground by further shortening of the piston rod and brought to the desired height.

In order to limit the stroke of the piston rod to a predetermined length, especially for mounting the attachment, feet 36, 37 of adjustable height may be attached to the supporting structure 4 or 31 as seen in FIG. 1.

A retaining rod 38 is supported on the vehicle 15 and connected to the suction conduit 8 by a chain 38' as illustrated in FIG. 1 for securing the downwardly directed section 24 of the suction conduit 8 in an upward position. To bring the section 24 into such upward position, the entire conduit 8 is simply rotated about the ring mount 22. In such upward position the piston cylinder arrangement 17 is substantially relieved from any load condition.

As mentioned, ball bearing ring mount 23 permits that the plane defined by the nozzle opening 39 may assume an inclined position relative to the horizontal. However, because of the inclined position of the downwardly directed section 24 of the suction conduit 8, the two ball bearing ring mounts 22 and 23 in combination permit the above mentioned pivoting movement of the suction nozzle 9.

Thus, the arrangement shown in FIG. 4 is not necessary for a satisfactory operation of the present invention. However, providing three or even more rotatably adjustable connecting means may be desirable, e.g. where especially difficult ground surfaces are involved.

The ability to adjust by means of the set screws 27' the height of the nozzle 9 above the ground is advantageous for matching the ground clearance of the suction opening to the height of the grass or the nature or shape of the ground, whereby the efficiency is increased.

Figure 3:
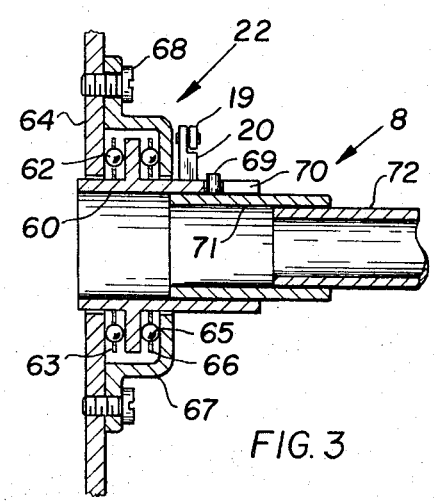
FIG. 3 is a partial, sectional view along the line 3—3 in FIG. 2.

FIG. 3 illustrates one possible example of the ball bearing ring mount 22 or 23. The horizontal section 21 of the conduit 8 has an end piece 60 provided with a flange 61. A first ball bearing 62 which has its balls secured in a cage 63 is arranged between the flange 61 and the housing wall 64 of the fan 1. A second ball bearing 65 with balls secured in a cage 66 is provided between the flange 61 and a closure cap 67 which secures the entire ring mount to said housing wall 64 as by screws 68.

In order to easily detach the conduit 8 from its end piece 60 a bayonet connection 69, 70 may be provided, for example, between the end piece 60 and a portion 71 of the horizontal conduit section. For varying the length of the horizontal section it may be deisrable to provide telescoping connections between several conduit portions such as 71 and 72. The ease of removal of the conduit 8 from its endpiece 60 has the advantage that the conduit may be transported on the vehicle when the attachment is not in use, thus avoiding interferring with the traffic since the fan and its drive need not be wider than the vehicle itself.

The above mentioned ability that the attachment is horizontally movable on guide tracks 29, 30, 31 transversely to the direction E of travel of the vehicle 15, for example, by means of a hydraulic cylinder, has the advantage that the suction conduit may be diverted in those cases where the shoulder is interrupted by particularly large obstructions, which are higher than the horizontal section 21 of the conduit 8. Such horizontal displacement of the suction means can also be achieved by varying the length of the horizontal section 21 as described with reference to FIG. 3. If both the above mentioned possibilities for horizontally adjusting the lateral position of the suction means 8, 9, are provided in combination the lateral stroke of the suction nozzle can cover a substantial range. In this way it is possible, for example by successive cleaning of parallel strips, to clear a particularly wide shoulder or median strip.

It is also possible to use a flexible hose to replace part or all of conduit 8. The hose would be movably supported above the ground by holding means controllably attached to the vehicle. Control by hand, for example by a handle attached to the suction nozzle 9 may also be provided for picking up grass, leaves, rubbish or the like from any surface, especially the road surface.

Where it is desired to do the mowing and picking up of the grass in one and the same operation, the invention proposes that the suction nozzle 9 should be preceded by said mowing device 11 which, for example, in the form of a mowing bar, can be secured directly to the suction nozzle as shown. Such a mowing device can be coupled to a power take-off shaft of the vehicle engine or to the driving engine of the suction fan, for example through a flexible shaft or a belt drive. It may also be driven hydraulically or electrically. Incidentally, the drive for the fan 1 could also be derived by means of a power take-off shaft directly from the vehicle engine. Such power take-off shafts are well known.

In view of the foregoing it will be appreciated that the nozzle movement in response to the shape of the ground takes place automatically due to the ease and facility provided by the invention in the form of the three dimensional, rotational adjustment of the suction means, whereby the movement of the suction nozzle is controlled directly by the ground profile. Such control brings with it a substantial improvement in the suction efficiency as compared with known apparatus since the position of the suction opening with respect to the ground, at any given instant, does not depend on the position of the entire attachment or of the vehicle, but depends directly on the profile of the ground in the area from which material is to be removed.

Figure 5:
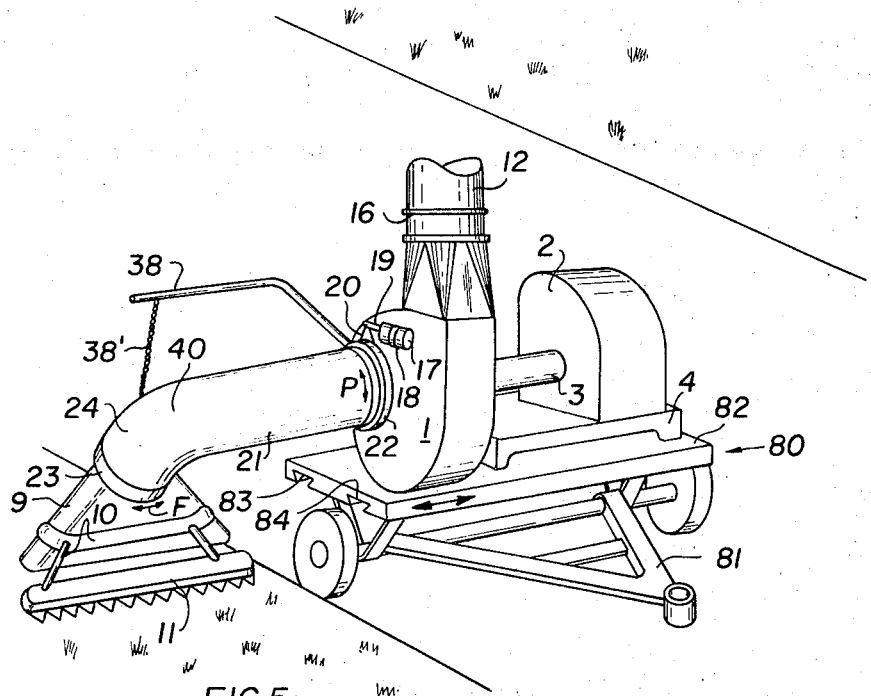
FIG. 5 is a perspective view of a further embodiment wherein the attachment is carried on a trailer.

FIG. 5 illustrates the further embodiment according to the invention wherein the attachment is supported on a trailer vehicle 80 comprising hitching means 81 for coupling the trailer to the vehicle 15. The trailer comprises a platform 82 which is movable back and forth in a horizontal direction as indicated by the double arrow V. The shifting of the platform 82 will be described in more detail with reference to FIG. 8. However, it should be noted here that the underside of the platform is provided with guide means 83, 84 which permit said horizontal back and forth shifting of the platform 82.

As in FIG. 1, the exhaust fan 1 is driven by an engine 2 coupled to the fan through a shaft 3. The engine may, for example, rest on its own support structure 4 which in turn is secured to the trailer platform 82. The remaining structural details correspond to those described with reference to FIG. 1 and therefore these details need not be described again. However, it should be noted that the horizontal leg 21 of the exhaust conduit will have a sufficient length, preferably an adjustable length as described with reference to FIG. 3 so that the downwardly extending and rearwardly slanting leg 24 of the exhaust conduit will clear the lateral confines of the vehicle and trailer. Due to the first rotatable connecting means 22 the horizontal leg 21 is rotatable back and forth in the directions of the double arrow P and due to the second rotating means 23 between the rearwardly slanting leg 24 and the suction nozzle 9 the latter is rotatable about the longitudinal axis of the downwardly slanting leg 24 as indicated by the double arrrow F.

The supporting rod 38 and the chain 38' will maintain the downwardly extending leg 24 in its slanting operating position whereby due to the yielding of the chain 38' the nozzle will continuously adjust its position in response to the shape of the ground.

Figure 6:
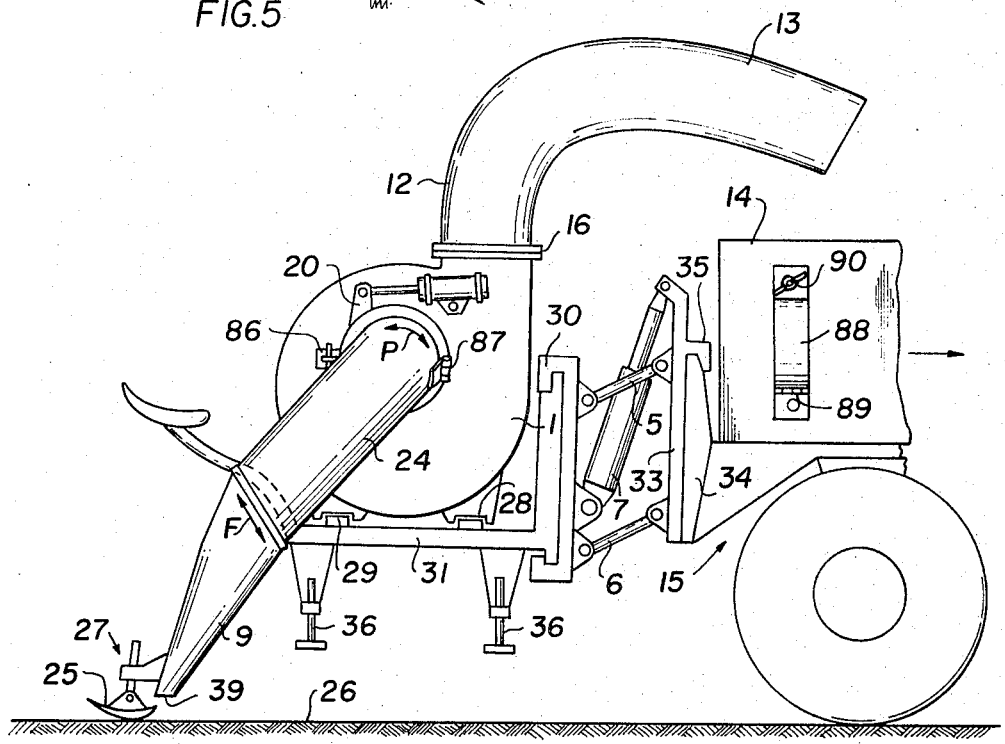
FIG. 6 illustrates a plan side view of a further embodiment wherein the attachment is carried on the rear end of a truck.

The embodiment of FIG. 6 is quite similar to that of FIG. 2 except that now the carrying plate 34 is attached to the rear end of the vehicle 15 rather than to its front end. Moreover, the embodiment of FIG. 6 comprises an operator seat 85 where an operator may sit for controlling the position of the nozzle 9, for example, simply by actuating the chain 38' or by handling power controls as will be described in more detail with reference to FIGS. 7 and 8.

A further modification illustrated in FIG. 6 comprises locking means 86 and hinge means 87 as well as a conduit supporting bail 88 attached to the side of the vehicle 15, for example, by means of a hinge 89 and a wing nut 90. When the conduit leg 21 extends horizontally outwardly and exhaust conduit 21, 24 is in its operating position and the locking means 86 are locked. However, when the exhaust conduit is to be transported, the locking means 86 are released and the conduit is tilted about the hinge 87 so that the leg 24 may rest against the side wall of the vehicle whereby it is held in this rest position by the bail 88.

Figure 7:
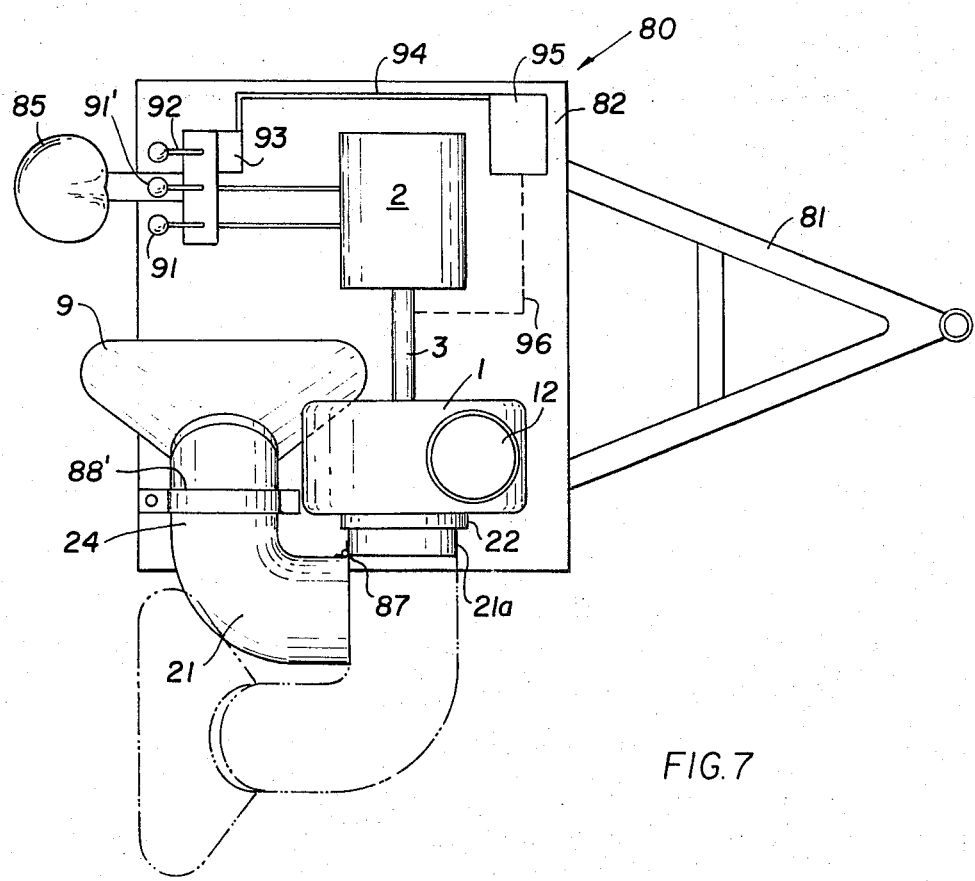
FIG. 7 shows a somewhat schematic top view onto the trailer arrangement of FIG. 5.

FIG. 7 illustrates a somewhat schematic top view onto the trailer according to FIG. 5. The full line representation of the exhaust conduits 21 and 24 shows these conduits in their rest position whereby the conduits are carried on the trailer. The dashed line representation of the exhaust conduits 21 and 24 shows these conduits in their operating position. Similar as in FIG. 6, hinge means 87' are provided for permitting the tilting of the exhaust conduits between their rest and their operating position. The exhaust conduits are also locked in their operating position just as in FIG. 6. Furthermore, the horizontal leg 21 of the exhaust conduit has a short flange portion 21a to which the remaining portion 21 is hinged by said hinge means 87'. A bail 88' is provided for securing the conduit means in their rest position on the platform 82 of the trailer 80.

Figure 8:
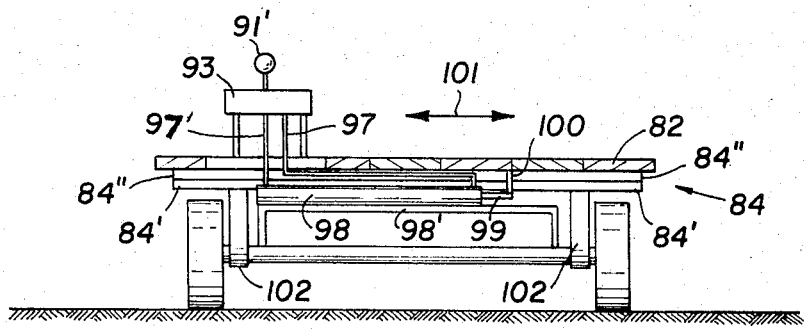
FIG. 8 is a rearview, partially in section of the trailer of FIG. 5, whereby the attachment members have been omitted since they are not necessary for showing the lateral adjustability of the trailer platform.

Adjacent to the operator seat 85 there are provided control means 91 for controlling the engine 2 as well as a further power means for shifting the platform 82 horizontally back and forth as indicated by the arrow V in FIG. 5 or by the arrow 101 in FIG. 8. For this purpose, a control lever 91' on a control panel 92 adjusts a valve 93 which is connected through a conduit means 94 to a source of power such as a compressor 95 which may, for example, also be carried on the platform 82 of the trailer 80. The compressor 95 may be driven by the shaft 3 of the engine 2 as indicated at 96.

The valve 93 is connected through conduits 97 and 97' to a piston cylinder arrangement 98 rigidly supported on a frame member 98' carried by the trailer. The piston rod 99 of the piston cylinder arrangement 98 is connected to the movable platform 82 through a link 100.

The platform 82 is supported on the trailer by guide means 84 comprising guide rods 84' and guide grooves 84''. As seen in FIG. 5, the guide grooves 84'' may have a cross sectional shape of a dovetail whereby a tilting or removal of the platform 82 in an upward direction is prevented. The guide rails 84' are rigidly supported on the trailer by frame members 102.

Since the piston cylinder arrangement 98 is rigidly supported on the frame structure of the trailer, the movement of the piston rod 99 will move the platform 82 toward the right when pressure is admitted through conduit 97. The platform will move to the left as seen in FIG. 8, when pressure is admitted through conduit 97'. Thus, the lateral extension of the suction conduit means 21, 24 may be controlled by the operator through the control lever 91'.

A special advantage of the invention is seen in that by arranging a carrier plate 34 at the front and rear end of the vehicle, it is possible to carry the attachment either at the front end or at the rear end without any modifications because the nose 35 will fit one or the other carrier plate 34.

In connection with the trailer embodiment it will be appreciated that separate steering means for the trailer may be provided so that the operator may steer the trailer along a soft shoulder, for example, while the pulling vehicle may remain on the hard surface road. Thus, a lateral control of the position of the suction conduit and nozzle is also possible, even if the piston cylinder arrangement 98 should be out of order.

With regard to the piston cylinder means 19 it should be noted that upon pressure release, the suction conduit means are free to rotate about the horizontal axis of the conduit leg 21.

As has been described above with reference to FIG. 3, the downwardly slanting leg 24 of the suction conduit means may also be arranged to telescope just as the horizontal conduit leg 21. In an alternative embodiment the leg 24 may be made of flexible material, for example rubber.

Although the invention has been described with reference to specific example embodiments, it is to be understood, that it is intended to cover all modifications and equivalents within the scope of the appended claims.

What is claimed is:

1. In an attachment for a utility vehicle having a front and a rear end, for removing items from the ground into a loading space by means of a suction fan having a housing with an inlet and an outlet in said housing, wherein suction conduit means extend to the ground through a horizontal leg from said inlet of the fan and through a downward leg connected to said horizontal leg, said horizontal and downward leg each having a respective longitudinal axis, wherein a delivery conduit connects the outlet of the fan to said loading space, and wherein a nozzle having a suction opening facing the ground is connected to said downward leg, the improvement comprising first rotatable connecting means for connecting one end of the horizontal leg of the suction conduit to the inlet opening of the housing of said suction fan, and second rotatable connecting means for connecting the nozzle to said downward leg of said suction conduit for permitting rotation of the nozzle relative to said downward leg of the suction conduit about said longitudinal axis of said downward leg and in response to the ground shape, whereby said first rotatable connecting means permit the downward leg of the suction conduit to float with respect to the ground so that its longitudinal axis remains in a slanted, trailing operating position relative to the direction of vehicle advance, and whereby the second rotatable connecting means allow the nozzle to pivot with respect to the slanting leg of the conduit to adapt the orientation of the nozzle to any variations in the contour of the ground in a direction perpendicular to the direction of travel.

2. The attachment according to claim 1, wherein said first rotatable connecting means comprise a rotatable bearing member interposed between the suction fan inlet and the horizontal leg of the suction conduit to allow for automatic rotation of the suction conduit about the longitudinal axis of its horizontal leg whereby the nozzle is allowed to move substantially vertically up and down.

3. The attachment according to claim 1, wherein said second rotatable connecting means comprises a further rotatable bearing member interposed between the downward leg of the suction conduit and the nozzle whereby the nozzle is rotatable about the slanted longitudinal axis of said downward leg of the suction conduit.

4. The attachment according to claim 1, further comprising a third rotatable member forming part of the nozzle for connecting the nozzle to said second rotatable connecting means whereby the nozzle may pivot relative to said downward leg of said suction conduit.

5. The attachment according to claim 1, further comprising means for mounting the suction fan on said front end of said vehicle, said suction conduit being of rigid construction, said horizontal leg of said suction conduit extending from said fan inlet laterally outwardly for a length sufficient so that said downward leg of the suction conduit clears the vehicle proper, and knee conduit means for rigidly joining the horizontal and downwardly slanted conduit legs to each other.

6. The attachment according to claim 5, wherein said horizontal conduit leg is spaced above the ground sufficiently to extend over ordinary road edge defining means.

7. The attachment according to claim 5, wherein said horizontal suction conduit leg comprises a plurality of telescoping conduit elements for horizontally extending the length of said suction conduit.

8. The attachment according to claim 1, wherein said first and second rotatable connecting means comprise ball bearing ring mount means.

9. The attachment according to claim 1, further comprising guide means attached to the nozzle for movement of the nozzle along the ground in spaced relation slightly above the ground, and means for adjusting said spaced relation.

10. The attachment according to claim 1, further comprising means for releasably connecting the suction conduit to said inlet of the suction fan.

11. The attachment according to claim 1, further comprising power means operatively connected to said suction conduit for rotating the latter as a unit between an inoperative and an operative position.

12. The attachment according to claim 1, further comprising a support structure, guide bars on said support structure extending horizontally and substantially perpendicularly to the direction of vehicle travel, and means for movably supporting said suction fan on said guide bars.

13. The attachment according to claim 1, wherein said suction conduit is a flexible hose, said attachment further comprising means for supporting said hose.

14. The attachment according to claim 1, further comprising a support structure, supporting arms pivotally connected to said support structure, carrier means also pivotally connected to said support arms, and power means operatively connected between said support structure and said carrier means for changing the relative elevation between the support structure and the carrier means, said carrier means comprising means for connecting the carrier means to the vehicle proper.

15. The attachment according to claim 14, wherein said means for connecting the carrier means to the vehicle proper are connected to the front end of the vehicle.

16. The attachment according to claim 1, further comprising means for rotatably securing said delivery conduit to the outlet of the suction fan, whereby the delivery conduit is rotatable about a vertical axis.

17. The attachment according to claim 14, wherein said means for connecting the carrier means to the vehicle proper are connected to the rear end of the vehicle.

18. The attachment according to claim 1, further comprising a trailer, means for attaching the trailer to said vehicle and means for supporting the attachment on said trailer.

19. The attachment according to claim 18, further comprising means as part of said suction conduit for rotating the latter into an inoperative position, and support means on said trailer for supporting the suction conduit in its inoperative position on the trailer.

20. The attachment according to claim 18, wherein said trailer comprises a movable platform for supporting said fan, means for supporting said platform, control means and power means operatively connected to said platform and responsive to said control means for shifting said platform laterally back and forth in a direction extending in a plane defined by said platform and substantially perpendicularly to the direction of vehicle advance.

21. The attachment according to claim 1, further comprising operator actuated control means operatively arranged for controlling the position of said nozzle.

22. The attachment according to claim 21, further comprising an operator seat positioned for facilitating the actuation of said operator actuated control means.

23. The attachment according to claim 1, further comprising means as part of said suction conduit for rotating the latter into an inoperative position wherein the suction conduit is located substantially within the width of said vehicle.

24. The attachment according to claim 23, wherein said suction conduit in its inoperative position rests on said vehicle.

25. In an attachment for a utility vehicle having a front end and a rear end, for removiang items from the ground into a loading space by means of a suction fan having a housing with an inlet and an outlet in said housing, wherein suction conduit means extend from said inlet in the housing to the ground, wherein a suction nozzle is attached to said suction conduit means, and wherein a delivery conduit connects the outlet of the fan housing to said loading space, the improvement comprising a horizontal suction conduit leg extending laterally outwardly from said fan housing, a downwardly slanting suction conduit leg connected to said horizontally extending suction conduit leg, said downwardly slanting suction conduit leg having a longitudinal axis extending at an angle relative to the horizontal and in a trailing position relative to the direction of vehicle advance, and rotatable connecting means for connecting said nozzle to said downwardly slanting suction conduit leg whereby said nozzle is permitted to rotate about said longitudinal axis of the downwardly slanting and trailing suction conduit leg.

26. The attachment according to claim 25, wherein said downwardly slanting leg of the suction conduit is made of flexible material.

* * * * *

UNITED STATES PATENT OFFICE
CERTIFICATE OF CORRECTION

Patent No. 3,778,865　　　　　　　　　　　Dated December 19, 1973

Inventor(s)　Alfred Schmidt, Jr. et al

It is certified that error appears in the above-identified patent and that said Letters Patent are hereby corrected as shown below:

[30] Foreign Application Priority Data

June 20, 1970  Germany  P 20 30 579.7

July 23, 1971  Germany  P 21 36 841.2

Signed and sealed this 19th day of November 1974.

(SEAL)
Attest:

McCOY M. GIBSON JR.      C. MARSHALL DANN
Attesting Officer       Commissioner of Patents